(12) United States Patent
Ackerman

(10) Patent No.: US 8,574,049 B1
(45) Date of Patent: Nov. 5, 2013

(54) PROXIMITY TAG RACE SYSTEM AND METHOD

(71) Applicant: Jake Ackerman, South Jordan, UT (US)

(72) Inventor: Jake Ackerman, South Jordan, UT (US)

(*) Notice: Subject to any disclaimer, the term of this patent is extended or adjusted under 35 U.S.C. 154(b) by 0 days.

(21) Appl. No.: 13/946,861

(22) Filed: Jul. 19, 2013

(51) Int. Cl.
*A63F 9/24* (2006.01)
*A63F 13/00* (2006.01)
*A63B 67/00* (2006.01)

(52) U.S. Cl.
USPC .............................................. 463/7; 473/415

(58) Field of Classification Search
USPC .............. 463/1, 4, 7, 29, 40–43, 53; 473/415, 473/451, 459, 465, 468, 469; 273/447; 340/323; 455/456.2, 456.3
See application file for complete search history.

(56) References Cited

U.S. PATENT DOCUMENTS

| | | | |
|---|---|---|---|
| 6,320,495 B1* | 11/2001 | Sporgis | 340/323 R |
| 6,530,841 B2 | 3/2003 | Bull et al. | |
| 6,691,032 B1* | 2/2004 | Irish et al. | 701/487 |
| 6,756,882 B2 | 6/2004 | Benes et al. | |
| 7,158,798 B2* | 1/2007 | Lee et al. | 455/456.3 |
| 7,435,179 B1* | 10/2008 | Ford | 463/42 |
| 8,257,177 B1* | 9/2012 | Saund et al. | 463/40 |
| 8,376,857 B1 | 2/2013 | Shuman et al. | |
| 2002/0006825 A1* | 1/2002 | Suzuki | 463/40 |
| 2002/0111201 A1* | 8/2002 | Lang | 463/2 |
| 2003/0036428 A1* | 2/2003 | Aasland | 463/29 |
| 2003/0144047 A1* | 7/2003 | Sprogis | 463/9 |
| 2003/0224855 A1* | 12/2003 | Cunningham | 463/41 |
| 2007/0167224 A1* | 7/2007 | Sprogis | 463/29 |
| 2008/0009349 A1* | 1/2008 | Wolfe | 463/42 |
| 2012/0129590 A1* | 5/2012 | Morrisroe et al. | 463/25 |

OTHER PUBLICATIONS

"How to Play Zombie Tag". Wikihow.com [dated Sep. 18, 2012], [online], [retrieved on Sep. 13, 2013]. <URL:http://web.archive.org/web/20120918032803/http://www.wikihow.com/Play-Zombie-Tag>. 9 pages.*
"Zombie Race: Fight the Infection". Yelp.com [dated Oct. 28, 2011], [online], [retrieved on Sep. 13, 2013]. <URL:http://www.yelp.com/events/arlington-zombi-race-fight-the-infection>. 2 Pages.*
"Zombie Tag: Challenge" iOS Application. iTunes.com [dated Mar. 8, 2013], [online], [retrieved on Sep. 13, 2013]. <URL:https://itunes.apple.com/us/app/zombie-tag-challenge/id546555375?mt=8>. 2 Pages.*
"Zombie Tag—Survive Your Friends!" iOS Application. iTunes.com [dated Mar. 27, 2013], [online], [retrieved on Sep. 13, 2013]. <URL:https://itunes.apple.com/app/zombie-tag-survive-your-friends!/id516428874?mt=8>. 2 Pages.*

* cited by examiner

*Primary Examiner* — Milap Shah
(74) *Attorney, Agent, or Firm* — Lyman Moulton, Esq.; Moulton Patents, PLLC

(57) ABSTRACT

A method for playing a game comprises outfitting at least two runners each with a locator device, accruing a number of running points to each runner for covering a predetermined distance within a game playing boundary and depleting a predetermined number of points from a runner who is 'tagged' by another runner in his/her proximity based on the locator device. The method also comprises awarding the depleted points to the other runner tagging the runner, wherein the number of points awarded for tagging a runner are greater than the number of points accrued for covering the predetermined distance to encourage tagging. The method additionally comprises awarding a predetermined number of points to a tagging runner who's rate of change in at least one of velocity and direction toward another runner in his/her proximity is greater than the other runner's respective rate of change in velocity and direction.

20 Claims, 8 Drawing Sheets

PROXIMITY TAG RACE SYSTEM AND METHOD

BACKGROUND AND FIELD OF INVENTION

Paintball has enjoyed a measure of commercial success for active entertainment enthusiasts. Paintball is a sport in which players compete, in teams or individually, to eliminate opponents by tagging them with capsules containing water soluble dye and gelatin shell outside (referred to as paintballs) propelled from a device called a paintball marker (commonly referred to as a paintball gun). Paintballs are composed of a non-toxic, biodegradable, water soluble polymer. The game is regularly played at a sporting level with organized competition involving worldwide leagues, tournaments, professional teams, and players. Paintball technology is also used by military forces, law enforcement, para-military and security organizations to supplement military training, as well as playing a role in riot response, and non-lethal suppression of dangerous suspects. Paintball games can be played on very hard floors in indoor fields, or outdoor fields of varying sizes. A game field is scattered with natural or artificial terrain, which players use for tactical cover. Game types in paintball vary, but can include capture the flag, elimination, ammunition limits, defending or attacking a particular point or area, or capturing objects of interest hidden in the playing area.

Paintball, however, appeals to a small segment of the active available players to those who are willing to be shot with hard pellets which explode and make a mess. Players are required to wear protective masks, and game rules are strictly enforced on a commercial field of play due to safety concerns. On the other hand, Laser tag is popular with a wide range of ages. When compared to paintball, laser tag is painless because it uses no physical projectiles, and indoor versions may be considered less physically demanding because most indoor venues prohibit running or roughhousing. Laser tag is a team or individual sport or recreational activity where players attempt to score points in direct sight typically with a laser gun aimed at another wearing an infrared-sensitive receiver. Laser tag has evolved into both indoor and outdoor styles of play, and may include simulations of combat, role play-style games, or competitive sporting events including tactical configurations and precise game goals. A commercial field of play for laser tag is also required and tightly controlled due to the expensive nature of the laser tagging equipment usually owned by the proprietor of the facility rather than personally owned by each participant.

Therefore, paint ball and laser tag are both limited to direct sight targets and tightly controlled commercial fields of play. Paintball requires bulky clothing for those sensitive to being target practice for gelatin paint capsules and laser tag requires bulky gear comprising infrared sensitive targets and processing electronics. For these reasons and more, there has been a long felt need for consumers to be able to play an active tagging game which neither involves pain, bulky clothing, messy paint and gear nor requires a line of sight tagging of an opponent on a tightly controlled commercial field of play.

SUMMARY OF THE INVENTION

A method for playing a game comprises outfitting at least two runners each with a locator device, accruing a predetermined number of running points to each runner for covering a predetermined distance within a game playing boundary and depleting a predetermined number of points from a runner who is 'tagged' by another runner in his/her proximity based on the locator device. The method also comprises awarding the depleted points to the other runner tagging the runner, wherein the predetermined number of points awarded for tagging a runner are greater than the predetermined number of points accrued for covering the predetermined distance within the game playing boundary to encourage tagging. The method additionally comprises awarding a predetermined number of points to a tagging runner who's rate of change in at least one of velocity and direction toward another runner is greater than a respective rate of change in velocity and direction for the other runner in proximity to the tagging runner.

The method for playing the disclosed game includes a runner being any attendee to an athletic race, a sporting event, a corporate event, a scholastic sporting event, and any attendee in a vehicle configured to transport the runner including bikes, motorcycles, cars, trucks, boats, planes, scooters, skate boards, roller blades, roller skates, roller shoes, skis, go-carts, golf carts and any personal conveyance device. The method also includes awarding a predetermined number of points to a runner for consideration who takes refuge from tagging within a virtual charging station boundary for a predetermined period of time during the game. The method also comprising a tagging sanctuary for any runner who takes refuge from tagging within a virtual resting station boundary for a predetermined period of time during the game, a longer time for stations further away from a starting point than for stations closer to the starting point. The method for playing the game further comprises disqualifying for a predetermined time any runner who initiates physical contact with any another runner including runners of a same team.

A non-transitory computer readable medium having computer useable program code executable to perform operations for playing a game, the operations of the computer readable medium comprises outfitting at least two runners each with a locator device, accruing a predetermined number of running points to each runner for covering a predetermined distance within a game playing boundary, and depleting a predetermined number of points from a runner who is 'tagged' by another runner in his/her proximity based on the locator device. The non-transitory computer readable medium comprises a tagging runner as a virtual construct of the program code configured to have its virtual location digitally determinable and displayable via an electronic processor, a memory for an application program comprising the computer useable program code executable for playing the game and a screen configurable for accessing an online common database tracking each runners' location, accrued points and a plurality of depleted points and game boundaries.

A system for playing a game, comprises a locator device for each of at least two runners, an accrual module configured to accrue a predetermined plurality of points to each runner for covering a predetermined distance within a game playing boundary; and a depleting module configured to deplete a predetermined plurality of points from a runner who is 'tagged' by another runner in his/her proximity based on the locator device.

Other aspects and advantages of embodiments of the disclosure will become apparent from the following detailed description, taken in conjunction with the accompanying drawings, illustrated by way of example of the principles of the disclosure.

Figure 1:
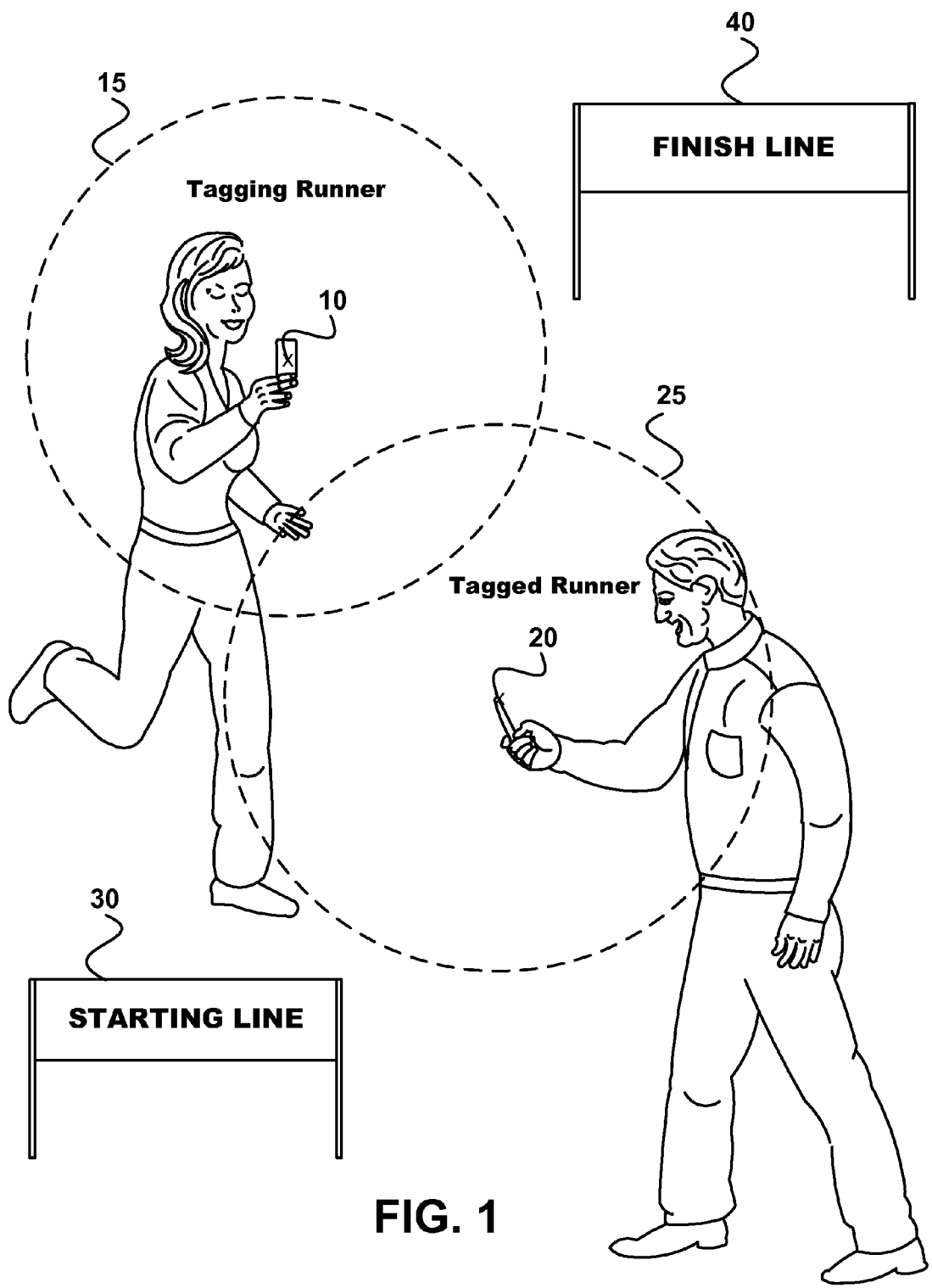
FIG. 1 is a pictorial of a method for playing a game of proximity tag race comprising runners tagging and racing via a location device in accordance with an embodiment of the present disclosure.

Throughout the description, similar and same reference numbers may be used to identify similar and same elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The term 'accrue' points used throughout the present disclosure refers to a common definition to accumulate or receive scored points. Therefore when a runner accrues a point for tagging someone in proximity to his or herself and/or running a predetermined distance, the runner scores that point for his or her action and accumulates subsequent points to his or her score. The term 'proximity' used in the present disclosure refers to a common definition of a relative nearness or closeness to another through a space or distance. The terms 'runner' and 'racer' may be used interchangeably throughout the present disclosure. Likewise, terms 'race' and 'run' are also used synonymously in the present disclosure according to conventional use of the term 'run' indicating a race event such as 'fun run' etc. Furthermore, the term 'runner' used in the present disclosure may include a person or persons walking, running, jogging, skipping, galloping, crawling, driving, riding and otherwise moving over ground by any natural or mechanical means.

FIG. 1 is a pictorial of a method for playing a game of proximity tag race comprising runners tagging and racing via a location device in accordance with an embodiment of the present disclosure. A runner or racer holding a location device 10 is depicted an approaching another runner or racer with a location device 20. A virtual proximity shell 15 generated from the first location device 10 intersects or virtually touches a second virtual proximity shell 25 generated from the second location device 20. A predetermined proximity of 1 meter of less between the runners determines a 'tagging' of the second runner by the first runner. A three dimensional virtual proximity shell (VPS) around each runner of a predetermined radius and determining proximity of another runner may be based on an overlap of any two runners' shells by at least a predetermined distance measuring a nominal 30 centimeters, the VPS extendable through any animate or inanimate thing or object. Once a location has been established in a longitude, latitude and altitude, a mathematical proximity may be calculated and therefore extend through any adjacent or near object to the runner. A starting line 30 marks a beginning point for a race event comprising the tagging activities and a finish line 40 marks a concluding point for the race event. Any number of participants may play the disclosed proximity tag race and game though only two have been depicted in FIG. 1. Additionally, any sufficiently large field of play may also be defined physically and electronically to accommodate any number of runners.

The disclosed proximity tag race therefore takes place in the real world though it may be tracked and displayed electronically. The avatar or the joystick for player control is actually the player himself or herself. The field of play for the disclosure may be displayed using Google® Earth or another mapping application or even a virtually constructed environment. The runners may therefore be electronically superimposed on the electronic field of play for display purposes but the actual field of play is the actual surroundings of the real world where the runners play the game. The field of play therefore may be not only a commercial area but an actual and unmodified urban or rural area including buildings and geographical landmarks.

Figure 2:
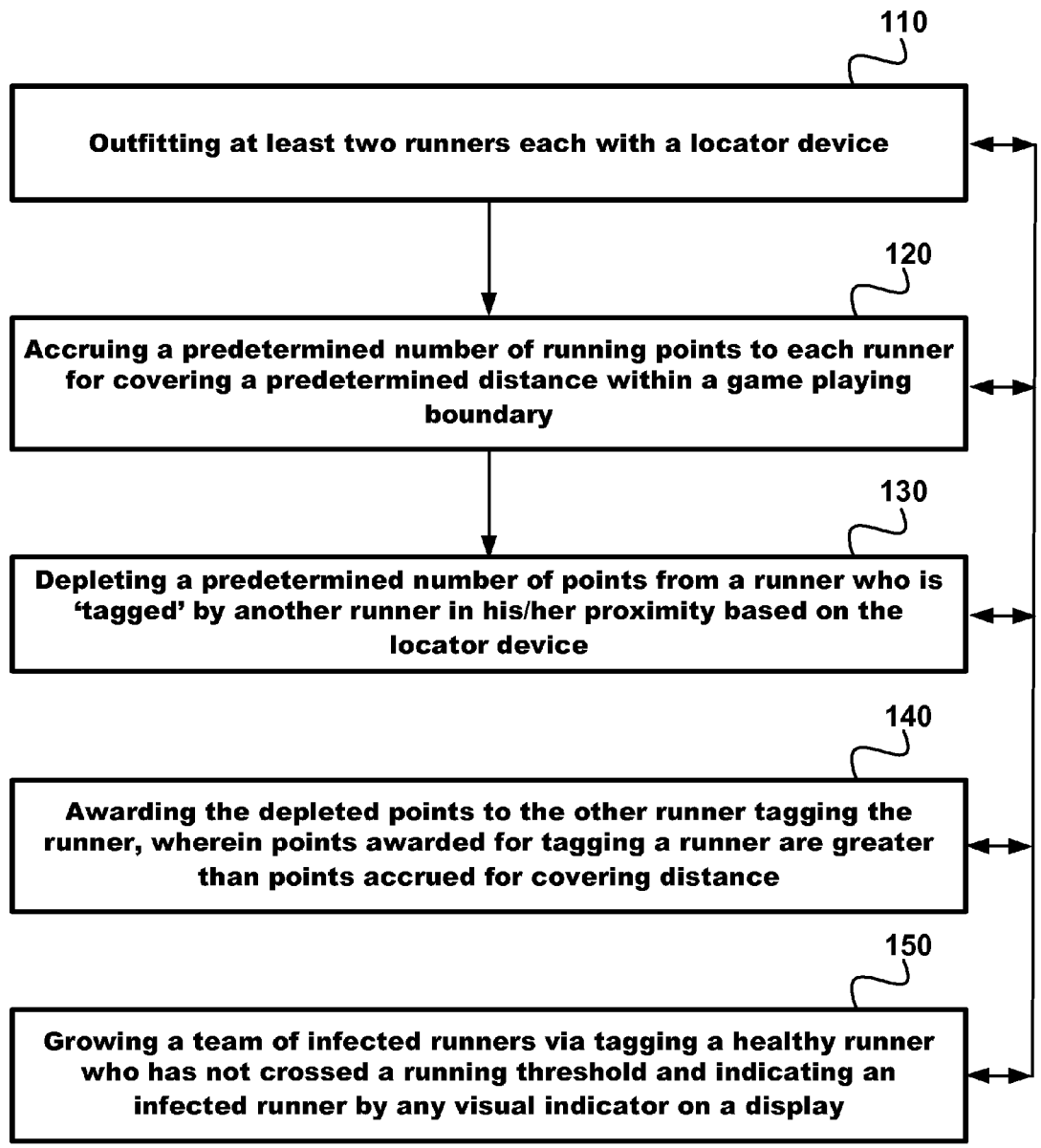
FIG. 2 is a flow chart of a method for playing a game of proximity tag race comprising runners tagging and racing via a location device in accordance with an embodiment of the present disclosure.

FIG. 2 is a flow chart of a method for playing a game of proximity tag race comprising runners tagging and racing via a location device in accordance with an embodiment of the present disclosure. A method for playing a game comprises 110 outfitting at least two runners each with a locator device, 120 accruing a predetermined number of running points to each runner for covering a predetermined distance within a game playing boundary and 130 depleting a predetermined number of points from a runner who is 'tagged' by another runner in his/her proximity based on the locator device. The method may also comprise 140 awarding the depleted points to the other runner tagging the runner, wherein the predetermined number of points awarded for tagging a runner are greater than the predetermined number of points accrued for covering the predetermined distance within the game playing boundary to encourage tagging. For instance, in an embodiment where 10 points were predetermined to be accrued to a runner for covering 1 kilometers of a 5 kilometer race, a tagging action may accrue 15 points to encourage runners to tag each other. On the other hand, where it was desirable to encourage running the race over tagging runners, a tagging action may only accrue 5 points compared with the 10 points for covering 1 kilometers out of a 5 kilometer race event. The method may further comprise 150 growing a team of to infected runners via an infected runner tagging a healthy runner who has not crossed a running threshold and indicating an infected runner by any visual indicator including changing an appearance of a runner's respective identification on a display. In regards to FIG. 2, steps 110, 120 and 130 comprise independent limitations of the claims herein and steps 140 and 150 comprise dependent steps of claims herein.

Figure 3:
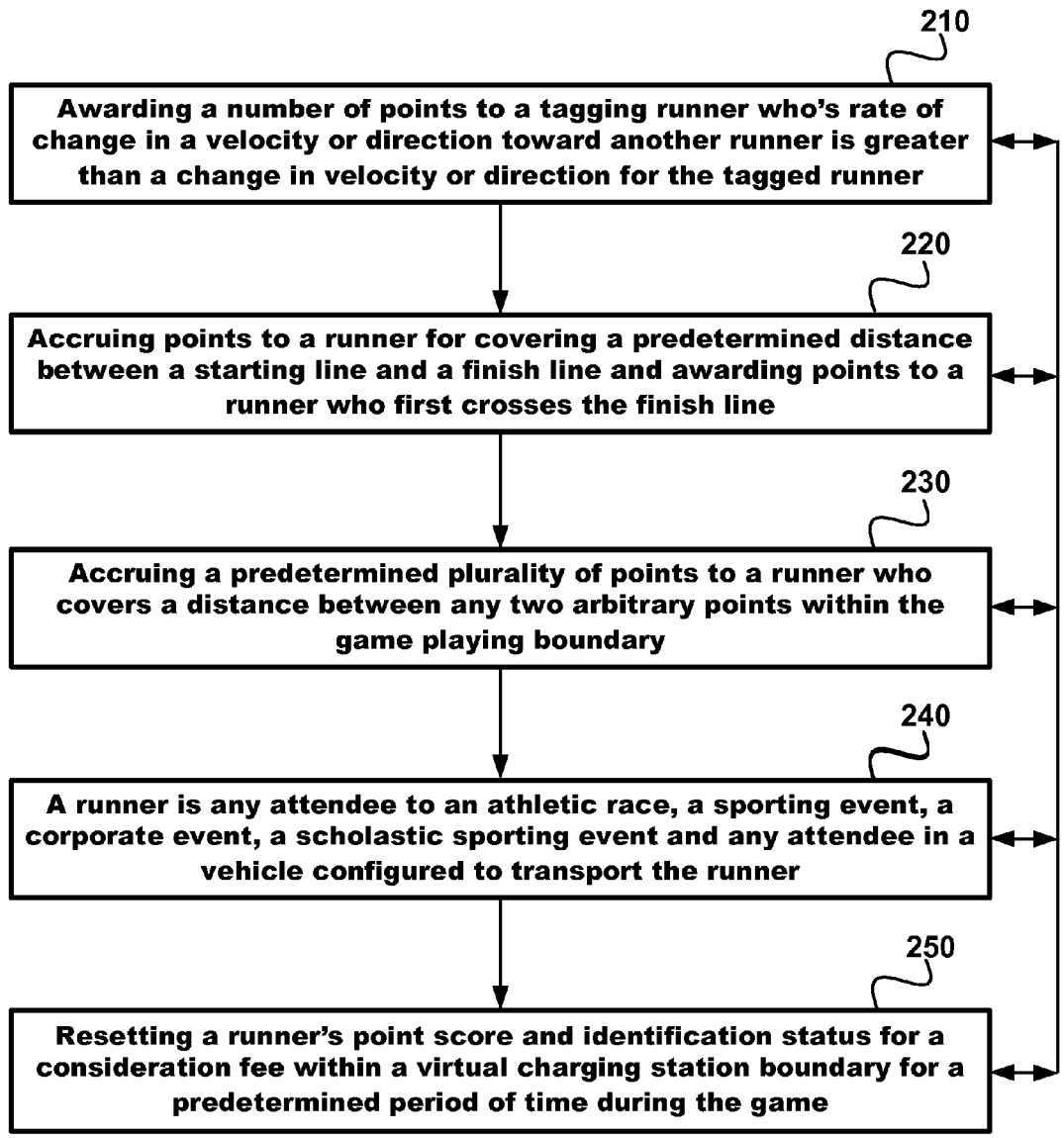
FIG. 3 is a flow chart of embodiments of a method for playing a game of proximity tag race comprising runners tagging and racing via a location device in accordance with an embodiment of the present disclosure.

FIG. 3 is a flow chart of embodiments of a method for playing a game of proximity tag race comprising runners tagging and racing via a location device in accordance with an embodiment of the present disclosure. The method comprises 210 awarding a predetermined number of points to a tagging runner who's rate of change in at least one of velocity and direction toward another runner is greater than a respective rate of change in velocity and direction for the other runner in proximity to the tagging runner. Those learned in the art may appreciate that a rate of change in one of a velocity and a direction comprise an acceleration of a tagging runner towards another runner. Therefore, an acceleration of a runner toward another runner greater than an acceleration of the other runner may accrue a predetermined number of points to the tagging runner for the tagging action.

An embodiment of the disclosed method may also comprise 220 accruing a predetermined plurality of points to a runner for covering a predetermined distance between a starting line and a finish line and awarding a predetermined plurality of points to a runner who first crosses the finish line. For instance it is a possible game scenario in the disclosed method that a first place runner to cross the finish line may accrue 100 points for being first but a tagging runner who does not finish even in the top 3 may outscore all other runners by accruing points for his or her tagging actions. The disclosed method may further comprise 230 accruing a predetermined plurality of points to a runner who covers a distance between any two points within the game playing boundary, the distance not necessarily progressing from a starting line to a finish line but including an absolute distance between any two arbitrary points.

An embodiment of the method for playing the disclosed game may additionally include 240 a runner being any attendee to an athletic race, a sporting event, a corporate event, a scholastic sporting event, and any attendee in a vehicle configured to transport the runner including bikes, motorcycles, cars, trucks, boats, planes, scooters, skate boards, roller blades, roller skates, roller shoes, skis, go-carts, golf carts and any personal conveyance device. Therefore, runners embodied in vehicles may accrue tagging points without damaging their vehicles by avoiding any actual contact with another vehicled or transported runner. Also where the proximity radius for tagging a runner is predetermined to be larger than 1 meter and including several meters, it would only be necessary for a non-transported runner to come within several meters of a vehicle transporting a runner to accrue tagging points from that vehicle runner.

An embodiment of the method may further include 250 resetting a runner's point score and identification status for a consideration fee within a virtual charging station boundary for a predetermined period of time during the game. Charging stations and/or resting stations may be used to cure an 'infected runner' to health. For a consideration or a fee, a runner may be given additional lives of health. Therefore a negative point score may be returned to a baseline or a zero score according to a predetermined fee for service. Also an embodiment may comprise awarding a predetermined number of points to a runner for consideration who takes refuge from tagging within a virtual charging station boundary for a predetermined period of time during the game. The charging station may additionally comprise electronic charging apparatus and necessary electric power for charging the power cells in a runner's location device. The consideration for charging power cells or devices may be monetary in the form of credit, debit or actual cash/change. The charging station may also comprise an electronic financial transaction for a runner who's total running and tagging points have depleted to a negative or zero score to buy points using credit, debit or cash. However, during the charging time period, the runner within the charging station boundaries gets amnesty or a buy from all tagging activity.

Figure 4:
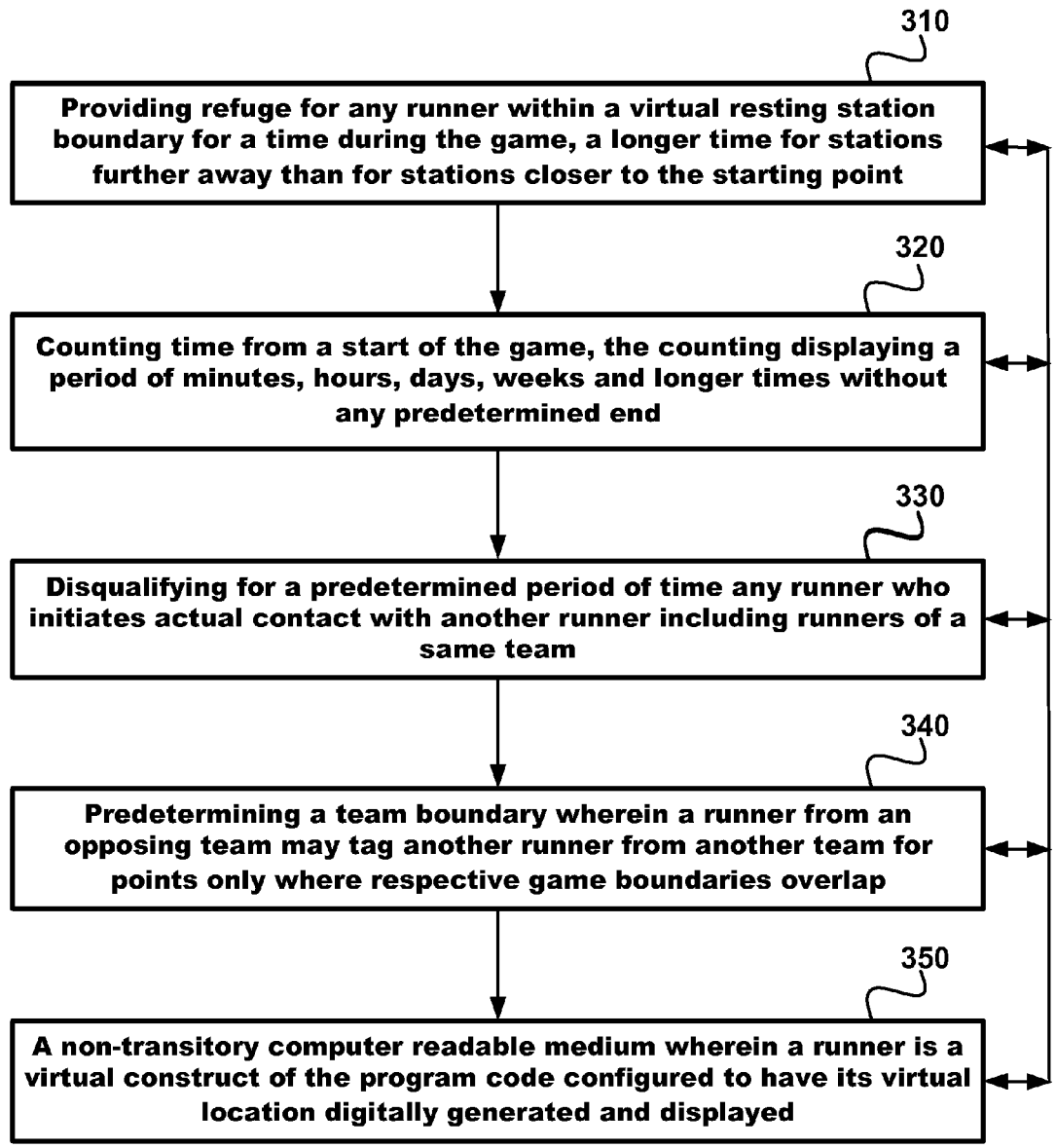
FIG. 4 is a flow chart of additional embodiments of a method for playing a game of proximity tag race comprising runners tagging and racing via a location device in accordance with an embodiment of the present disclosure.

FIG. 4 is a flow chart of additional embodiments of a method for playing a game of proximity tag race comprising runners tagging and racing via a location device in accordance with an embodiment of the present disclosure. The embodiments may include 310 providing refuge from tagging for any runner within a virtual resting station boundary for a predetermined period of time during the game, a longer time for stations further away from a starting point than for stations closer to the starting point. Therefore, the resting station allows a runner to catch his or her breath without the threat of losing their accrued points through being tagged by another runner. The resting station need not be an actual structure but a electronic designation for sanctuary from tagging so a runner may rest. A practical limit on the number of runners allowed in any one resting station may be allowed in an embodiment of the present disclosure.

An embodiment of the disclosed method may include 320 counting a period of time from a start of playing of the game, the counting displayable on any programmable application device configurable for playing the game, the counting comprising a period of minutes, hours, days, weeks and longer time periods without any predetermined end. However, at least one runner crossing the finish line may bring the game play to an end for tagging points based on the rules predetermined for a particular game in play.

The method for playing the game may further comprise and embodiment for 330 disqualifying for a predetermined time any runner who initiates physical contact with any another runner including runners of a same team. Contact with another runner may be defined as a proximity closer than a typical and predetermined arm's length though actual contact may not have occurred.

The disclosed method for playing a game of proximity tag race may include 340 predetermining a team boundary each for a plurality of teams wherein a runner from an opposing team may tag another runner from another team for accruing points only where respective game boundaries overlap. Proximity outside the overlapping team boundaries may therefore not accrue points to either runner. The qualifying overlapping area may be displayed electronically or it may be indicated via building and/or physical landmarks in the field of play boundaries.

Another embodiment of the disclosed game may include 350 a runner being a virtual construct of the program code configured to have its virtual location digitally generated and displayable via an electronic processor, a memory for an application program comprising the computer useable program code executable for playing the game and a screen configurable for accessing an online common database tracking each runners' location, accrued points and a plurality of depleted points and game playing boundaries. The appearance of the virtual construct may be defined via an avatar of a runner's choosing or a random avatar determined by the disclosed software application, aka a non-transitory computer readable medium having computer useable program code executable to perform operations for playing the disclosed proximity tag race.

Figure 5:
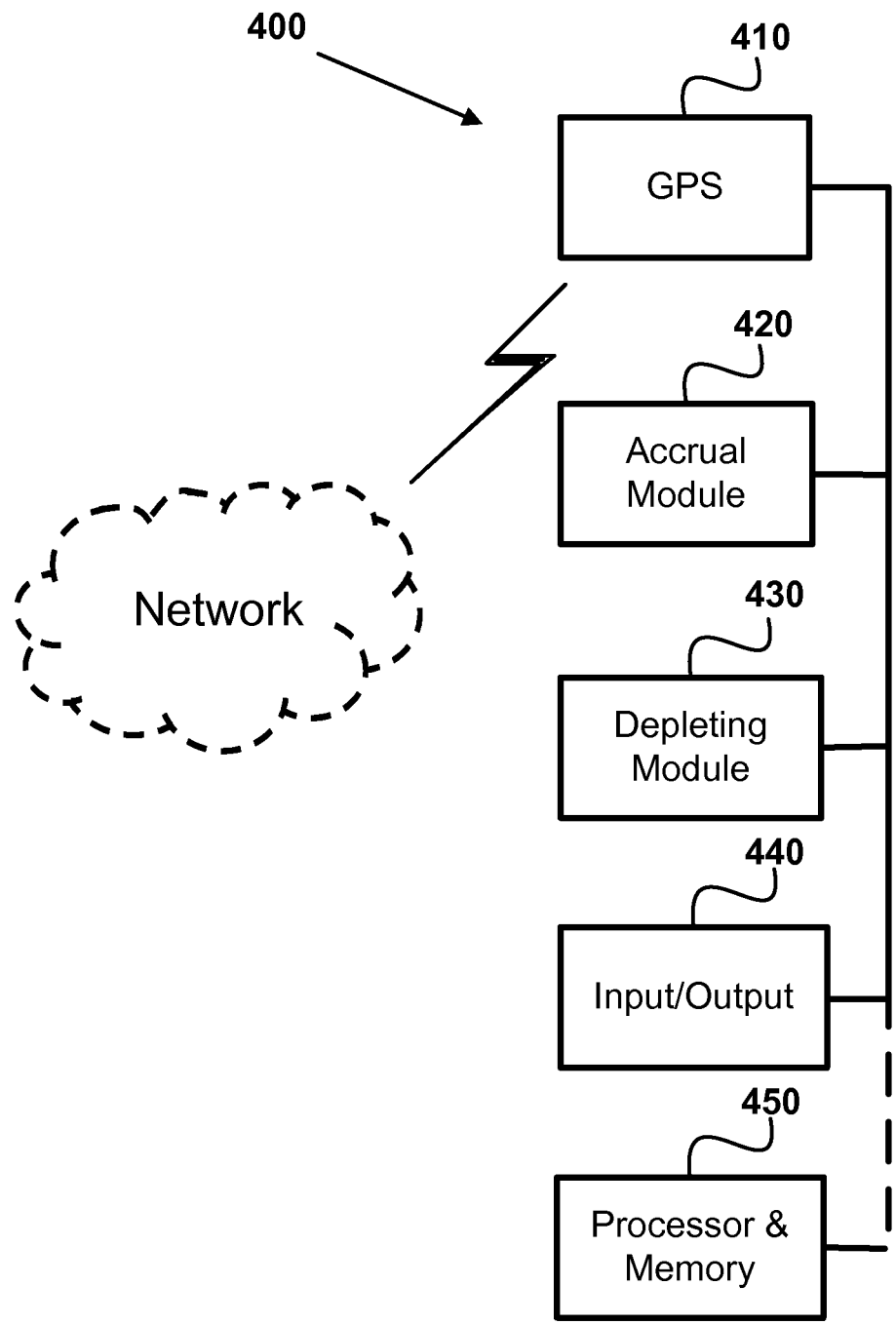
FIG. 5 is a block diagram of a device for playing a game of proximity tag race comprising runners tagging and racing via a location device in accordance with an embodiment of the present disclosure.

FIG. 5 is a block diagram of a device for playing a game of proximity tag race comprising runners tagging and racing via a location device in accordance with an embodiment of the present disclosure. The device 400 may include 410 a locator device such as a GPS (Global Positioning System) semiconductor chip for each of at least two runners, 420 an accrual module configured to accrue a predetermined plurality of points to each runner for covering a predetermined distance within a game playing boundary and 430 a depleting module configured to deplete a predetermined plurality of points from a runner who is 'tagged' by another runner in his/her proximity based on the locator device. The device may also include an input/output module or component configured to indicate an accrued point and a depleted point by one of sound, vibration, light and any sensation stimulation. An option 450 for a microprocessor and associated memory may be included in the device or in an associated system for implementing the disclosed method for playing proximity tag race.

Figure 6:
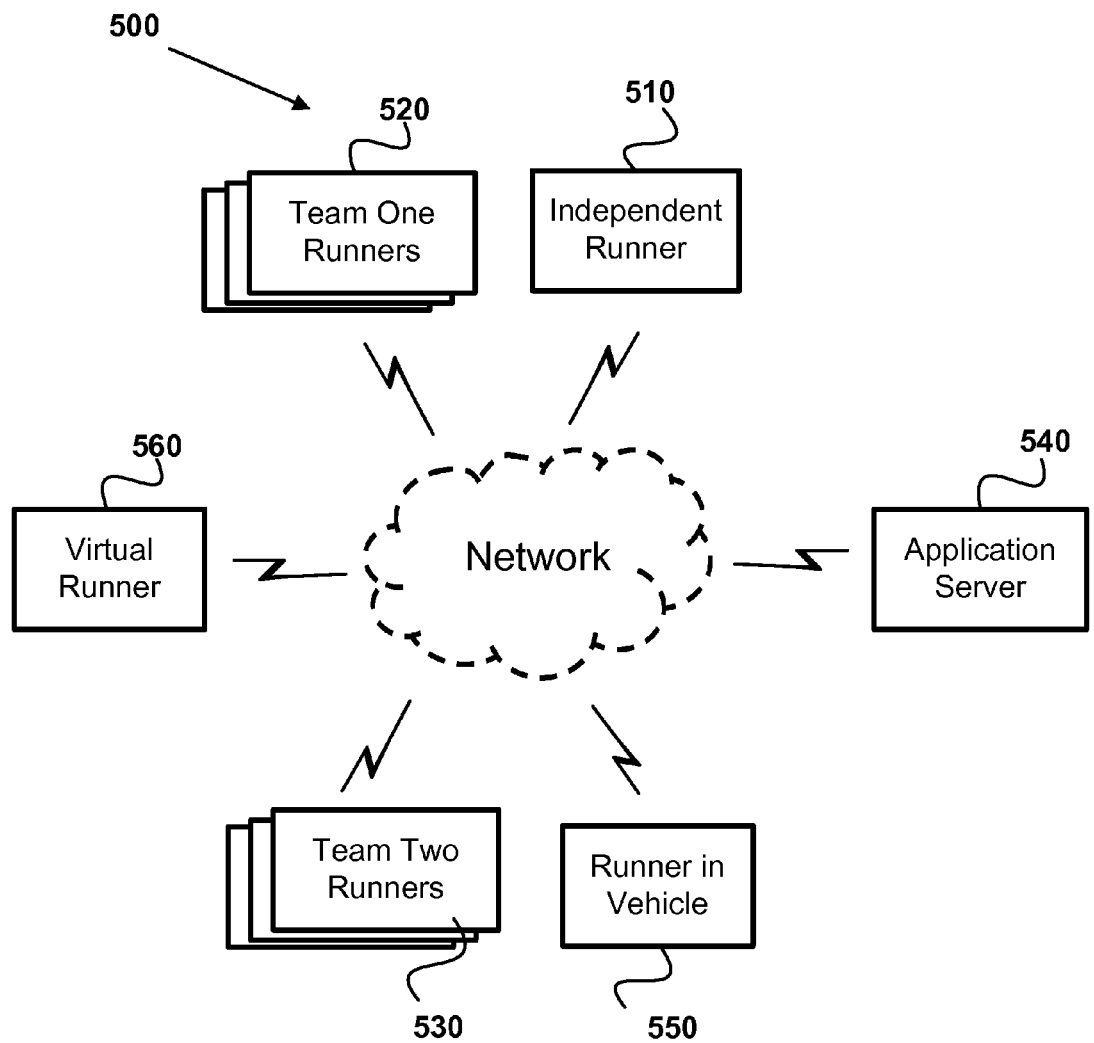
FIG. 6 is a block diagram of a system for playing a game of proximity tag race comprising runners tagging and racing via a location device in accordance with an embodiment of the present disclosure.

FIG. 6 is a block diagram of a system for playing a game of proximity tag race comprising runners tagging and racing via a location device in accordance with an embodiment of the present disclosure. The system 500 includes an independent runner 510, a first team of runners 520, a second team of runners 530, an application server 540, a vehicled or transported runner 550 and a virtual runner 560. All the runners are linked or in communication with the application server and/or with each other for peer to peer play where an application resides on each runner's device, via a GPS via wireless electromagnetic communication devices and methods.

Figure 7:
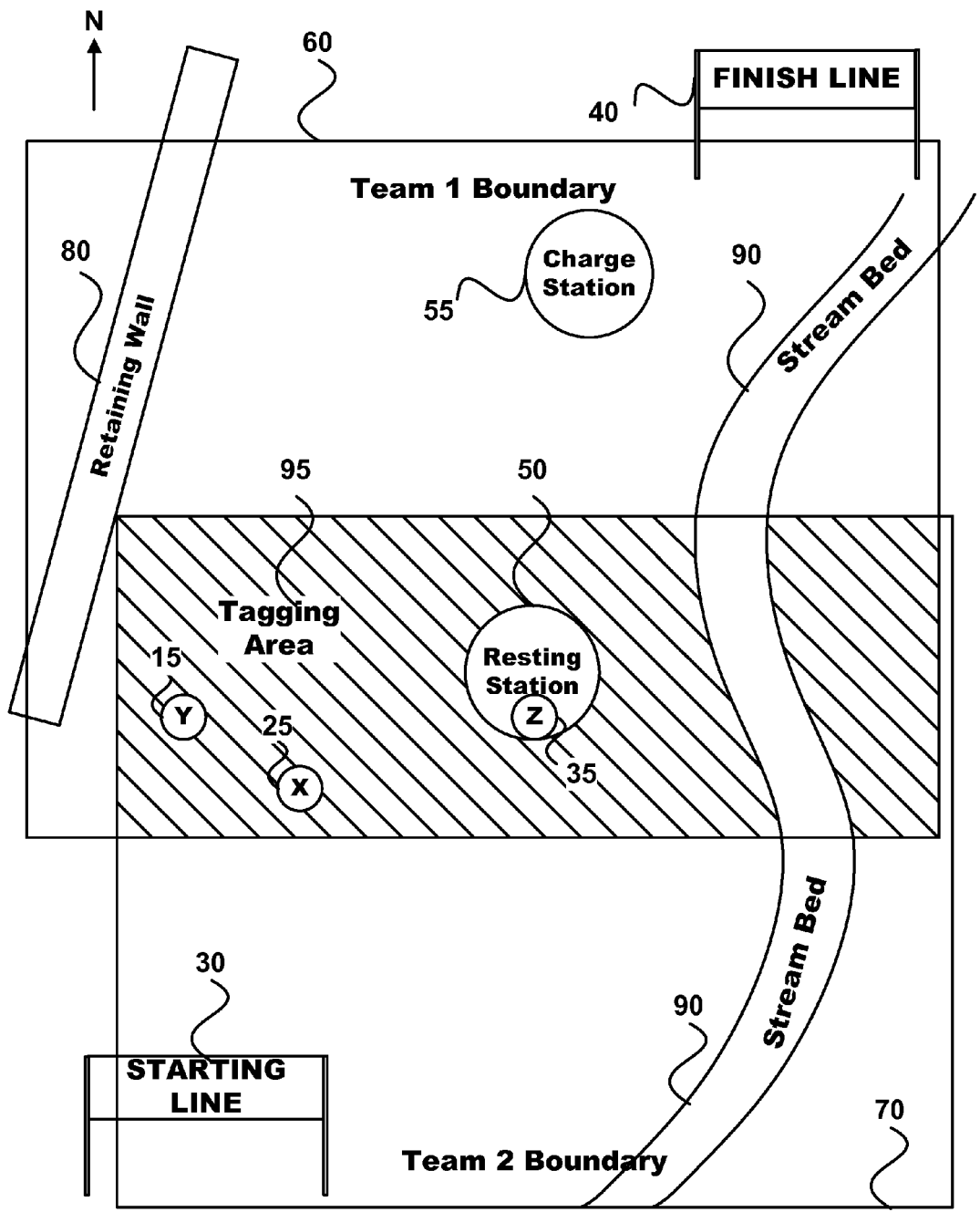
FIG. 7 depicts components of an electronic display of a method for playing a game of proximity tag race comprising runners tagging and racing via a location device in accordance with an embodiment of the present disclosure.

FIG. 7 depicts components of an electronic display of a method for playing a game of proximity tag race comprising runners tagging and racing via a location device in accordance with an embodiment of the present disclosure. The displayed components of the system and application include a first runner's location device 15 held by the first runner or disposed on his or her clothing or person, a second runner's location device 25 held by the second runner or disposed on his or her clothing or person and a third runner's location device 35 held by the third runner or disposed on his or her clothing or person. The third runner 'Z' is within the boundaries of the Resting Station 50 and thus may not be tagged by another runner while he or she is resting. However, once the proximity shell or radius of runner 'Z' falls completely outside of the Resting Station boundary 50, he or she is vulnerable to being tagged by another runner. The displayed components of the system and application also include a starting line 30 and a finish line 40, a resting station 50, a charging station 55, a first team boundary 60 including a retaining wall western boundary 80 and a second team boundary 70 including a stream bed boundary 90. The tagging area 95 shown in cross hatched lines is an overlap of the first team boundary and the second team boundary and is thus designated for tagging activity between any runners of FIG. 6 and any runners otherwise not so enumerated. The location of a runner on the display may be marked by a proximity radius or shell relative to a location device. The appearance of the runner on the display may be defined via an avatar of a runner's choosing or a random avatar determined by the disclosed software application. Though a single charging station 55 and a single resting station 50 are depicted in FIG. 7, any number of charging stations and/or resting stations may be implemented in the game at any location as determined by the players, the software application or by an administrator of the method, system and non-transitory computer readable medium having computer useable program code executable to perform operations for playing the disclosed game.

The retaining wall 80 and the stream bed 90 may be considered and indicated 'off limits' boundaries for playing the disclosed game. Also, any area west of the retaining wall 80 and any area east of the stream bed 90 may be considered 'off limits' to game play so that runners do not have to compromise safety crossing the wall or the stream. Team 1 boundary 60 and Team 2 Boundary 70 may be arbitrarily set by the software application or by physical obstacles such as streets, buildings, hills etc. Alternatively, boundaries may be set by visual indicators such as lights, colored lines painted on fields and or lines 'drawn' in the dirt or sand. Runners therefore may run a route or path directly between the starting line 30 and the finish line 40 or any arbitrary path or route as necessary for tagging, avoiding obstacles and other runners and otherwise playing the game. The objective to the game may be to score the highest number of individual points by running or by tagging. On the other hand, the objective of the game may be team oriented to block certain runners from being tagged by other teams in order to get the first place running points for the team. A blocking runner may therefore lose points by depletion to the other team tags in order to allow a faster runner to finish the race without being 'double teamed' and going negative in his or her total points. Countless strategies are therefore possible playing the disclosed proximity tag race game.

In an embodiment of the disclosure, a zombie tag run comprises at least one predetermined initial zombie who turns healthy and uninfected runners into zombies by tagging them. Any runner able to reach the finish line without being tagged gets permanent immunity from being turned to a zombie. Any runner able to reach a charging station or a resting station gets temporary immunity from being turned. However, runners who are turned may subsequently themselves turn other runners into zombies by tagging them. Therefore, a game of zombies versus the runners, aka humans may ensue. Charging stations and/or resting stations may also be used to cure a zombie to return to human form. A consideration fee at a charging station may therefore cure a zombie and give a runner multiple human lives in the disclosed embodiment of the present disclosure. The disclosed system, method and application may indicate a runner being turned to a zombie by any visual indicator including changing an appearance of a runner's respective avatar or the color of a runner's identification on the location device display. Therefore, an embodiment may include growing a team of infected runners (zombies) via an infected runner tagging a healthy runner (human) who has not crossed a running threshold (a finish line or a resting/charging station boundary) and indicating an infected runner by any visual indicator including changing an appearance of a runner's respective identification (avatar) on a display (location device display).

Figure 8:
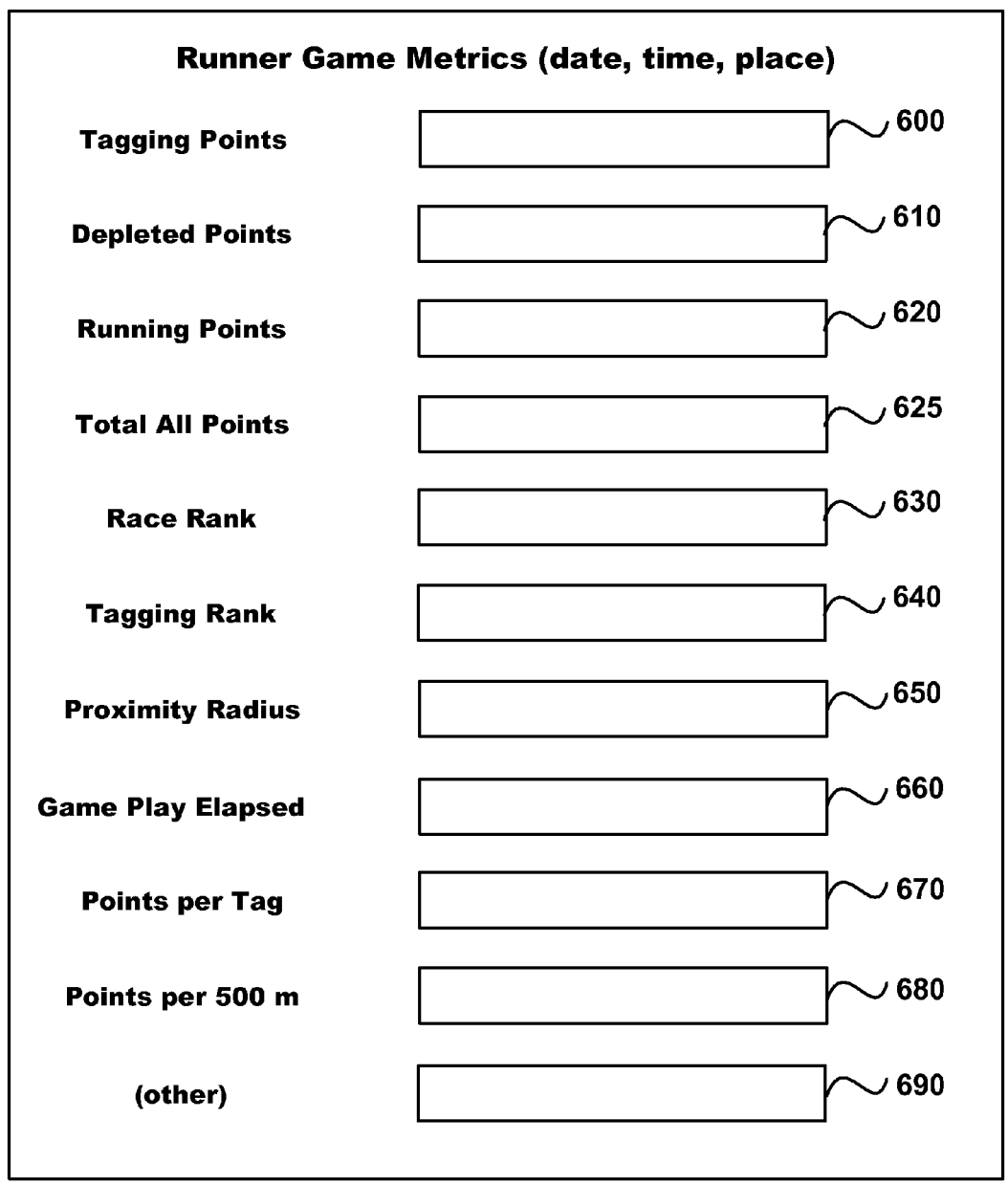
FIG. 8 depicts another electronic screen display configurable for accessing an online common database tracking a runners' points and game metrics for playing the game in accordance with an embodiment of the present disclosure.

FIG. 8 depicts another electronic screen display configurable for accessing an online common database tracking a runners' points and game metrics for playing the game in accordance with an embodiment of the present disclosure. The online database may be accessible by all runners via their locator device and wireless input/output module(s), the database configured to track the accrued points and a plurality of depleted points for each runner, a plurality of resting station boundaries and play game boundaries. An embodiment of the electronic screen display may include tagging points 600, depleted points 610, running points 620, total all points 625, race rank 630, tagging rank 640, proximity radius 650, game play elapsed 660, points per tag 670, points per 500 meters 680 and any other metric as determined by the disclosed method, device and system 690.

'Points per 500 meters' may be varied to comprise points per 100 meters or any arbitrary and predefined distance between any two points in the race and tagging event. For instance, where a runner has covered a distance of 1000 meters and is awarded 50 points for every 500 meters, his or her 'Running Points' score would display '100' points and the 'Points per 500 m' would display '50.' However, in the event that the 'Points per Tag' field on the display indicated '10' points and that runner had also been tagged twice by another 'tagging runner' his or her 'Depleted Points' field on the display would show '20' and his or her 'Total All Points' may indicate '80' since they had lost 20 of their running points to being tagged by another runner who's 'Tagging Points' display would indicate at least '20' points scored. The Race Rank and Tagging Rank fields of display may indicate a first place, second and third places and any number of places where a smaller number indicates a higher placing rank in number of points accrued. As also explained above, runners placing first or in the top three to cross a finish line may be awarded a prorated larger number of points such as '500' for first place, '400' for second place etc as an incentive for running the race. However, the top ranking tagging runners may also be awarded a prorated larger number of points such as '600' for the top tagging runner, '500' for the second most scoring tagging runner etc as an incentive for tagging during the race. A tagging runner may therefore outscore a first place runner though her or she did not even finish the race. Other outcomes are also comprised in embodiments of the disclosed game based on a bias predetermined toward running the race or tagging during the race.

The present disclosure also includes A non-transitory computer readable medium having computer useable program code executable to perform operations for playing a game, the operations of the computer readable medium comprises outfitting at least two runners each with a locator device, accruing a predetermined number of running points to each runner for covering a predetermined distance within a game playing boundary, and depleting a predetermined number of points from a runner who is 'tagged' by another runner in his/her proximity based on the locator device. The non-transitory computer readable medium comprises a tagging runner as a virtual construct of the program code configured to have its virtual location digitally determinable and displayable via an electronic processor, a memory for an application program comprising the computer useable program code executable for playing the game and a screen configurable for accessing an online common database tracking each runners' location, accrued points and a plurality of depleted points and game boundaries.

Because each locator device may be personally owned by a runner, there is no need for a tightly controlled commercial field of play and any area, surface and or environment may be used to accommodate any number of runners. Also since there is no physical contact of persons or projectiles or even photons or electromagnetic waves of any frequency or amplitude, runners may play the disclosed proximity tag race completely clean, safe and secure. The disclosure also is versatile to allow any number of runners or players from 1 to any number of individuals or any number of teams of any size. The disclosed proximity tag race system and method also enables play from a computer application program on a single hand held or bodily disposed location device or between a server and any number of hand held or bodily disposed terminal devices.

As explained above, the disclosed proximity tag race therefore takes place in the real world though it may be tracked and displayed electronically. Players of the disclosed game, aka runners score points through real physical activity by their actual movements within game boundaries. The field of play and a runner's relation thereto may be displayed via Google® Earth but the actual field of play is the real world where the runners play the game and tag each other. The electronic devices and software applications and programs merely facilitate keeping track of points, rank and elapsed game play time but are not required to play the game disclosed herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for playing a race game, comprising:
designating a starting line, a finishing line, and a set of physical game play boundaries between the starting line and the finishing line;
outfitting each of at least two runners with a locator device, wherein the at least two runners include one or more runners of a first type and one or more runners of a second type, and wherein the locator device is configured to determine its physical location within the set of physical game play boundaries between the starting line and the finishing line;
for each of the one or more runners of the first type or of the second type, accruing, by at least one processor, a first predetermined number of points for covering a predetermined distance within the set of physical game play boundaries between the starting line and the finishing line, the predetermined distance determined by the locator device; and
depleting, by the at least one processor, a second predetermined number of points from a first runner of the first type or of the second type when tagged by a second runner of the first type or a third runner of the second type, wherein the first runner is tagged by the second runner or the third runner based on: (i) a proximity between the first runner and the second runner or the third runner, determined by the locator devices of the first runner and the second runner or the third runner, without the second runner or the third runner physically contacting the first runner, and (ii) a rate of change in at least one of a velocity and a direction of the second or third runners toward the first runner being greater than a respective rate of change in velocity and direction of the first runner in proximity to the second or third runners.

2. The method of claim 1, further comprising:
awarding the depleted second predetermined number of points to the second or third runner who tagged the first runner, wherein the second predetermined number of points is greater than the first predetermined number of points to encourage tagging.

3. The method of claim 1, further comprising:
growing a team of runners of the second type via the one or more runners of the second type tagging the one or more runners of the first type who have not crossed a running threshold, wherein the tagged runners of the first type are converted and join the team of runners of the second type thereby becoming runners of the second type; and visually indicating the team of runners of the second type by a visual indicator on a display device coupled to the locator device.

4. The method of claim 1, further comprising:
awarding a third predetermined number of points to one of the at least two runners who's rate of change in at least one of a velocity and a direction toward another one of the at least two runners is greater than a respective rate of change in velocity and direction of the another one of the at least two runners in proximity to the one of the at least two runners.

5. The method of claim 1, further comprising:
generating a three-dimensional virtual proximity shell around each of the at least two runners of a predetermined radius; and
determining a proximity of between two of the at least two runners based on an overlap of the two runners' three-dimensional virtual proximity shells by at least a predetermined distance, wherein the three-dimensional virtual proximity shells are extendable through any animate or inanimate things or objects.

6. The method of claim 1, wherein the locator device comprises any one or more of an electronic device including a global positioning system (GPS), an electronic processor, a memory device storing an application program for playing the race game, and a display device configured to access an online common database that tracks each of the at least two runners' locations, points, and the set of physical game boundaries.

7. The method of claim 1, wherein the locator device comprises any one or more of a global positioning system (GPS) chip and an indicator configured to indicate accrued and/or depleted points by one of sound, vibration, and sensation stimulation.

8. The method of claim 1, further comprising:
maintaining an online database accessible by the locator device of each of the at least two runners, the database tracking accrued and/or depleted points for each of the at least two runners and a plurality of resting station boundaries.

9. The method of claim 1, further comprising:
awarding a third predetermined number of points to one of the at least two runners who crosses the finish line first.

10. The method of claim 1, wherein the predetermined distance is a distance between any two points within the set of physical game boundaries.

11. The method of claim 1, wherein the set of physical game boundaries is displayable as one or more virtual components on a display device coupled to the locator device, the set of physical game boundaries including one or more of a street, a walkway, a path, a stream, a building, a structure, a barrier, a wall, an embankment, a slope, a drop-off, a cliff, a fence, a hedge, and a tree.

12. The method of claim 1, wherein the at least two runners are participants of at least one of an athletic race, a sporting event, a corporate event, a scholastic sporting event, and any participant within a vehicle configured to transport the runner including any one of a bike, a motorcycle, a car, a truck, a boat, a plane, a scooter, a skateboard, a pair of roller blades, a pair of roller skates, a pair of roller shoes, a pair of skis, a go-cart, and a golf cart.

13. The method of claim 1, further comprising:
resetting a points value and a type of a runner from a second type to a first type for a consideration fee or a second points value within a virtual charging station boundary or a resting station boundary for a predetermined period of time during the race game.

14. The method of claim 1, further comprising:
providing refuge to at least one of the at least two runners when within a virtual resting station boundary for a predetermined period of time during the race game, wherein the predetermined period of time is based on the distance between the virtual resting station boundary and the starting line.

15. The method of claim 1, further comprising:
disqualifying, for a predetermined time, any runner of the at least two runners who initiates physical contact with any other runner of the at least two runners.

16. The method of claim 1, further comprising:
counting a period of time from a start of playing the race game, the counting displayable on a display device coupled to the locator device, the counting comprising a period of minutes, hours, days, weeks, and years without any predetermined end.

17. The method of claim 1, further comprising:
designating predetermined team boundaries for each a plurality of teams, wherein the runners of the first type comprise a first team and the runners of the second type comprise a second team, and wherein a runner from the second team is enabled to tag a runner from the first team only where the respective team boundaries overlap.

18. A non-transitory computer-readable medium having computer readable instructions stored thereon, which when executed by at least one processor, causes the at least one processor to perform operations for playing a race game, comprising:
designating a starting line, a finishing line, and a set of physical game play boundaries between the starting line and the finishing line;
associating each of at least two runners with a locator device, wherein the at least two runners include one or more runners of a first type and one or more runners of a second type, and wherein the locator device is configured to determine its physical location within the set of physical game play boundaries between the starting line and the finishing line;
for each of the one or more runners of the first type or of the second type, accruing, by the least one processor, a first predetermined number of points for covering a predetermined distance within the set of physical game play boundaries between the starting line and the finishing line, the predetermined distance determined by the locator device; and
depleting, by the at least one processor, a second predetermined number of points from a first runner of the first type or of the second type when tagged by a second runner of the first type or a third runner of the second type, wherein the first runner is tagged by the second runner or the third runner based on: (i) a proximity between the first runner and the second runner or the third runner, determined by the locator devices of the first runner and the second runner or the third runner, without the second runner or the third runner physically contacting the first runner, and (ii) a rate of change in at least one of a velocity and a direction of the second or third runners toward the first runner being greater than a respective rate of change in velocity and direction of the first runner in proximity to the second or third runners.

19. The non-transitory computer-readable medium of claim 18, wherein a runner of the at least two runners is a virtual construct, of the computer-readable instructions, configured to have its virtual location digitally generated and displayable via a display device coupled to the locator device.

20. A system for playing a race game, comprising:
a plurality of locator devices; and
a processor configured to:
- designate a starting line, a finishing line, and a set of physical game play boundaries between the starting line and the finishing line;
- associate each of at least two runners with a respective one of the plurality of locator devices, wherein the at least two runners include one or more runners of a first type and one or more runners of a second type, and wherein each of the locator devices are configured to determine their physical location within the set of physical game play boundaries between the starting line and the finishing line;
- for each of the one or more runners of the first type or of the second type, accrue a first predetermined number of points for covering a predetermined distance within the set of physical game play boundaries between the starting line and the finishing line, the predetermined distance determined by the locator device; and
- deplete a second predetermined number of points from a first runner of the first type or of the second type when tagged by a second runner of the first type or a third runner of the second type, wherein the first runner is tagged by the second runner or the third runner based on: (i) a proximity between the first runner and the second runner or the third runner, determined by the locator devices of the first runner and the second runner or the third runner, without the second runner or the third runner physically contacting the first runner, and (ii) a rate of change in at least one of a velocity and a direction of the second or third runners toward the first runner being greater than a respective rate of change in velocity and direction of the first runner in proximity to the second or third runners.

* * * * *